United States Patent [19]

Sasaki et al.

[11] 4,351,052

[45] Sep. 21, 1982

[54] COAXIAL TYPE GAS-FLOW LASER DEVICE

[75] Inventors: Kouji Sasaki; Hiroyuki Sugawara; Kouji Kuwabara, all of Hitachi; Toshiharu Shirakura, Tokai; Satoshi Takemori, Hitachi; Norio Ikemoto, Tokai, all of Japan

[73] Assignee: Hitachi, Ltd., Tokyo, Japan

[21] Appl. No.: 119,316

[22] Filed: Feb. 7, 1980

[30] Foreign Application Priority Data

Feb. 21, 1979 [JP] Japan ................................ 54-19393

[51] Int. Cl.³ ............................................. H01S 3/05
[52] U.S. Cl. ...................................... 372/58; 372/99
[58] Field of Search ................. 331/94.5 G, 94.5 P, 331/94.5 C, 94.5 D

[56] References Cited

U.S. PATENT DOCUMENTS 3,921,098  11/1975  Hoag .............................. 331/94.5 G

FOREIGN PATENT DOCUMENTS 52-43981 of 1977 Japan.

Primary Examiner—William L. Sikes
Assistant Examiner—Léon Scott, Jr.
Attorney, Agent, or Firm—Antonelli, Terry & Wands

[57] ABSTRACT

In a coaxial type gas-flow laser device in which a laser beam axis, an electric discharge axis and a gas flow axis are coincident, at least one centrifugal blower is employed for circulating a laser gas. Where two centrifugal blowers are employed, they oppose to each other in an axial direction of discharge tubes.

4 Claims, 3 Drawing Figures

COAXIAL TYPE GAS-FLOW LASER DEVICE

BACKGROUND OF THE INVENTION

This invention relates to a gas-flow laser device, and more particularly to a coaxial type gas-flow laser device which exhibits a stable discharge.

In a high-power $CO_2$ gas laser device, forced convectional cooling is adopted as a gas cooling method. The gas is circulated by a blower, and its temperature having risen in a discharge portion is lowered by a heat exchanger.

The gas-flow laser device has three axes, i.e., a laser beam axis, a gas flow axis and an electric discharge axis. The laser device is divided into the following three modes by the combination of the directions of the three axes; (1) a coaxial type gas flow laser device in which three axes are coincident, (2) a cross beam type gas flow laser device in which a gas flow axis and an electric discharge axis are coincident and a laser beam axis intersects orthogonally with the other two axes, (3) a 3-axes orthogonal-intersection type gas flow laser device in which the three axes intersect orthogonally to one another.

In a coaxial type gas laser device, the pressure loss of a gas flow passage is, for the most part, attributed to the electric discharge. In case of considering devices of equal maximum laser outputs, the pressure loss in the coaxial type laser device is approximately 10 times greater than in a 3-axes orthogonal-intersection type gas laser device wherein the three axes intersect orthogonally to one another or a cross beam type laser device wherein only the beam axis intersects orthogonally to the other two axes. In the coaxial laser device, accordingly, there has heretofore been employed a Roots blower which is a displacement blower capable of providing a high discharge pressure even under a low gas pressure of 10-50 Torr. For example, a coaxial gas flow laser device provided with a Roots blower is shown in the publication "THE WELDING INSTITUTE RESEARCH BULLETIN, pages 29-33, Feb. 1976". It is unavoidable that the gas flow becomes a pulsating one which has lowered flow rate parts in a proportion of two times per revolution of a rotor shaft. The inventors' investigation on the transition phenomenon of the glow discharge to the arc discharge has revealed that, in the case where the Roots blower is employed, the flow rate of the gas fluctuates considerably in correspondence with the rotation of the blower, the arc transition being initiated at a part at which the flow rate is the smallest.

It is known that the laser output is proportional to the injection input in the glow discharge. In addition, the upper limit of the injection input in the glow discharge is proportional to the quantity of gas flow. As the flow rate is smaller, the transition to arc discharge occurs at a lower discharge input. Since the arc discharge is scarcely concerned in the excitation of laser gas molecules or atoms, the glow discharge becomes unstable and the function of the laser device is not effected. So, in order to obviate the instability of glow discharge, a restriction like an orifice or a nozzle is provided at the upper stream of the discharge tube and the shockwaves are generated. However, since the restriction increases the pressure loss at the restriction part, the ratio of an inlet pressure $P_i$ to an outlet pressure $P_o$ of the blower must be increased for obtaining more than 1 kW high power laser. Consequently, there is a disadvantage that the driving force of the blower should be increased and the whole size of the laser device should be large.

As a method of suppressing an increase in a driving force as is brought about by the increase of the blower pressure ratio owing to the adoption of the restriction, it is considered to make the period of the pulsations extremely short as compared with a period of time in which the laser gas passes through the discharge portion. More specifically, in attaining a high power of 1-2 kW/min. With a coaxial type laser device circulating a gas at high speed, the period of time in which laser gas molecules pass through a discharge portion is recommended to be at most 10 millisecond, and it is usually selected to be 2-5 millisecond. When the period of the pulsations is made sufficiently short as compared with the specified time, that is, when the rotational frequency of a rotor shaft is raised, the influence of the pulsating flow can be lessened. However, the rotor shafts are in mechanical mesh in the Roots blower. Even in a small-sized Roots blower, therefore, a realizable rotational frequency is limited to 5,000 r.p.m. Even in this case, the period of the pulsating flow becomes 6 millisecond. It has been difficult to attain a good glow discharge, i.e., a stable laser output without adopting any nozzle.

On the other hand, in a cross beam type or a 3-axes orthogonal-intersection type laser device, the gas flows in a state of plane instead of axial flow as in a coaxial type laser device. Since the pressure loss is small, an axial-flow blower or a centrifugal blower may be employed. U.S. Pat. No. 3,921,098 shows a cross beam type laser device using an axial-flow blower. Japanese utility model publication No. 52-43981 (filed on 1977) shows one using a centrifugal blower. In these prior arts, when the gas pressure increases, the discharge becomes unstable and the reliability of the laser decreases.

SUMMARY OF THE INVENTION

An object of this invention is to provide a coaxial type gas laser device producing a stable glow discharge and having a high overall efficiency.

According to a preferred embodiment of this invention, in view of the fact that the pulsations of a gas flow rate affecting the stability of glow discharge need to be eliminated in order to attain a stable laser output with a coaxial gas laser device, a turbo-centrifugal blower of high speed rotation is employed as a gas circulating blower, to remove the pulsations of the gas flow rate, whereby the glow discharge can be stabilized. The preferable rotational frequency of the centrifugal blower is higher than 5,000 r.p.m.. Furthermore, the laser device can be made compact by arranging the two turbo-centrifugal blowers in opposing relationship to each other.

DETAILED DESCRIPTION OF THE PREFERRED EMBODIMENT

Figure 1:
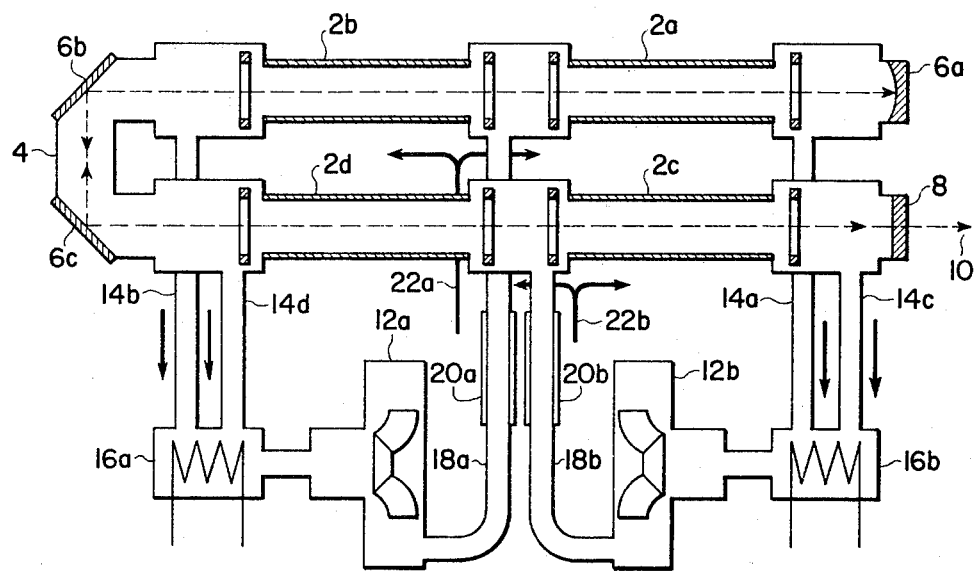
FIG. 1 is a sectional view of an coaxial type gas-flow laser device of this invention.

Hereunder, an embodiment of this invention will be described with reference to FIG. 1. Discharge tubes 2a, 2b on one side and discharge tubes 2c, 2d on the other side are arrayed in parallel. The respective discharge tubes have a high voltage applied onto the central sides of a laser device, and the four tubes 2a, 2b, 2c, 2d execute discharge in parallel. When a $CO_2$ laser is taken as an example, the laser device is filled with a mixture gas under 20–30 Torr consisting of $CO_2$, $N_2$ and He, and the $CO_2$ gas is excited by the electric discharge in the four tubes. A communicating vessel 4 is mounted which is provided on one end side of the discharge tubes 2a, 2c with a total-reflection mirror 6a and an output mirror 8 and which is provided on one end side of the discharge tubes 2b, 2d with total-reflection mirrors 6b, 6c corresponding respectively to the total-reflection mirror 6a and the output mirror 8. A laser beam has its direction diverted 180 degrees by means of the total-reflection mirrors 6b, 6c, and reciprocates between the total-reflection mirror 6a and the output mirror 8. An optical resonator is constructed of an electric discharge portion, the total-reflection mirrors 6a, 6b, 6c and an output mirror 8. The gas excited by the glow discharge is induced by the laser beam to emit light and to amplify the laser beam. The output mirror 8 is a mirror which transmits part of the laser beam therethrough and which reflects part therefrom. The transmitted light is utilized as a laser beam 10. Au-evaporated mirrors, Cu mirrors, Mo mirrors etc. are employed as the total-reflection mirrors 6a, 6b, 6c, while a special mirror of Ge, GaAs, ZnSe or the like is employed as the output mirror 8 because the $CO_2$ laser emits far infrared light having a wavelength of 10.6 μm.

Figure 2:
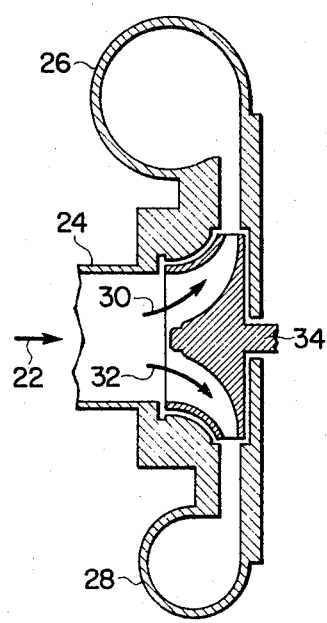
FIG. 2 is a sectional view of an turbo-centrifugal blower employed in the laser device shown in FIG. 1.

The laser gas having had its temperature raised by the flow discharge within the discharge tubes 2a, 2b, 2c, 2d is circulated by high speed rotation type centrifugal blowers 12a, 12b opposing to each other. After passing through the discharge tubes, it passes through vertical pipes 14a, 14b, 14c, 14d and is cooled by heat exchangers 16a, 16b. Hereunder the flow of the gas is described in detail. The gas having entered the centrifugal blower 12a is compressed and discharged, whereupon it flows upwards from a blower outlet pipe 18a and through an insulating pipe 20a as a gas flow 22a and branches into the discharge tubes 2a, 2b. The gas discharged from the other centrifugal blower 12b flows from a blower outlet pipe 18b and through an insulating pipe 20b as a gas flow 22b and is fed into the discharge tubes 2c, 2d. The gas flows having undergone temperature rises in the discharge tubes 2b, 2d join, and the resultant flow is cooled by the heat exchanger 16a and enters the centrifugal blower 12a. Likewise, the hot gas in the discharge tubes 2a, 2c is cooled by the heat exchanger 16b and then enters the centrifugal blower 12b. A schematic sectional view of the centrifugal blower 12a, 12b is shown in FIG. 2. FIG. 2 illustrates a general form of a turbo-centrifugal blower. A gas flow 22 entering a blower inlet 24 flows into a scroll 26, 28 as a gas flow 30, 32 in the circumferential directions of a vane wheel 34 which is rotated at a high speed of or above 5,000 r.p.m. by the high-frequency motor. The gas is discharged from the blower.

Unlike a volumetric compression type blower such as a Roots blower wherein two rotors are rotated within a single cylinder and a gas is forcibly red by displacement, the centrifugal blower achieves the effect of compression owing to the centrifugal force of a gas based on the rotation of the vane wheel, and it undergoes at most 5% of pulsations of the gas flow and is free from the large pulsations as in the Roots blower.

Figure 3:
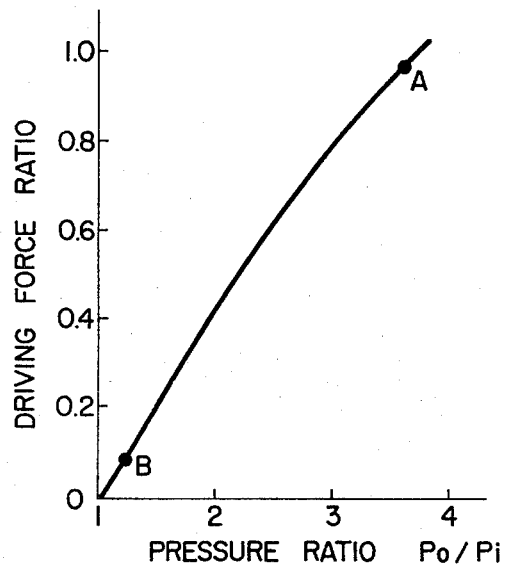
FIG. 3 is a graph which shows the relationship between a pressure ratio and a driving force ratio.

In practice, it is considered that the pulsation factor is permitted up to approximately 30% in laser devices. When the nozzle structure is employed in the Roots blower in order to make a pulsation factor of 60–80% at most 30%, the pressure ratio must be made approximately three times greater than in the case of employing no nozzle structure, and when the nozzle structure is employed in order to make the pulsation factor at most 5%, the pressure ratio must be made approximately six times greater. In order to make the pressure ratio three times greater, the driving force needs to be ten times greater. FIG. 3 shows the relationship between the pressure ratio and the driving force ratio. Point A is an operating point in the case where the nozzle structure was employed in the Roots blower and where the pulsation factor was made 30%, while point B is an operating point in the case where the pulsation factor was 5% with the high speed rotation turbo-centrifugal blower.

That is, in attaining equal laser outputs, the use of the high speed rotation turbo-centrifugal blower requires only a driving force of 1/10 of that in the case of using the Roots blower. In consequence, it has been possible to sharply enhance the overall efficiency of the laser device.

The above is the description of one preferred embodiment of this invention. Although the discharge tubes have been constructed in two rows in this example, a high power laser device can be constructed in compact form in such a way that the tubes are formed into even rows such as four rows, every half of which is caused to correspond with a blower. Further, this invention is applicable, not only to the $CO_2$ laser device of the present embodiment, but also to other gas laser devices such as CO lasers and Ar lasers.

According to the present invention, the following advantages are obtained.

(1) Since the coaxial type laser device is provided with a centrifugal blower, variations in a flow rate versus time are as small as possible and a high outlet pressure is obtained even under a low pressure condition. Accordingly, a glow discharge is stable and a high power laser is obtained.

(2) Since several centrifugal blowers are arranged so as to oppose to one another in the axial direction of the discharge tubes, the overall arrangement of the blowers, the discharge tubes, the heat exchangers and tubes connecting them is simple and made compact.

(3) The gas blown out from each blower flows separately in half into two discharge tubes. The half of the gas blown out from one blower and the other half blown out from the other blower confluent together. The confluented gas is cooled by the heat exchanger and is back to each blower. So, the temperature of the gas in the discharge tubes are uniform.

What we claim is:

1. In a coaxial type gas-flow laser device having
   an optical resonator which is constructed of an electric discharge portion filled with an active laser gas, a total-reflection mirror disposed at one end of said electric discharge portion and an output mirror disposed at the other end of said electric discharge portion,
   heat exchanger means for cooling said laser gas heated by electric discharge, and
   blower means for circulating said laser gas, a laser beam axis, an electric discharge axis and a gas flow axis being coincident, the improvement comprising said blower means being provided as at least one turbo-centrifugal blower and means for operating said blower at a rotational speed which is higher than 5000 r.p.m.

2. In a coaxial type gas-flow laser device having
an optical resonator which is constructed of an electric discharge portion filled with an active laser gas, a total-reflection mirror disposed at one end of said electric discharge portion and an output mirror disposed at the other end of said electric dicharge portion,
heat exchanger means for cooling said laser gas heated by electric discharge, and
blower means for circulating said laser gas, a laser beam axis, an electric discharge axis and a gas flow axis being coincident, wherein said blower means comprises two turbo-centrifugal blowers in opposing relationship to each other.

3. The coaxial type gas-flow laser device defined in claim 2, wherein the electric discharge portion of said optical resonator comprises two sections, and wherein each blower communicates with a midpoint of a respective section so that the gas blown out from each blower separates in half into two flows, and wherein said heat exchanger means communicates with the ends of said sections so that the half of the gas blown out from one blower and the half blown out from the other blower confluent together and the other half blown out from the other blower and the other half blown out from the one blower confluent together.

4. A coaxial type gas-flow laser device comprising
an optical resonator which is constructed of an electric discharge portion filled with an active laser gas, a total-reflection mirror disposed at one end of said electric discharge portion and an output mirror disposed at the other end of said electric discharge portion, said electric discharge portion comprising first, second, third and fourth tubes,
heat exchanger means for cooling said laser gas heated by electric discharge, and
two turbo-centrifugal blowers disposed in opposing relationship to each other for circulating said laser gas, the outlet of said one blower being connected with said first and second discharge tubes in parallel and the outlet of said other blower being connected with said third and fourth discharge tubes in parallel, said second discharge tube and said fourth discharge tube being connected to the inlet of said one blower, and said first discharge tube and said third discharge tube being connected to the inlet of said other blower so that the flows of said laser gas in said first and third discharge tubes confluent with each other and the flows of laser gas in said second and fourth discharge tubes confluent with each other.

* * * * *